Feb. 24, 1931. P. P. GUTIERREZ 1,794,014
AUTOMOBILE STOP AND TURNING SIGNAL
Filed Jan. 30, 1929   2 Sheets-Sheet 1
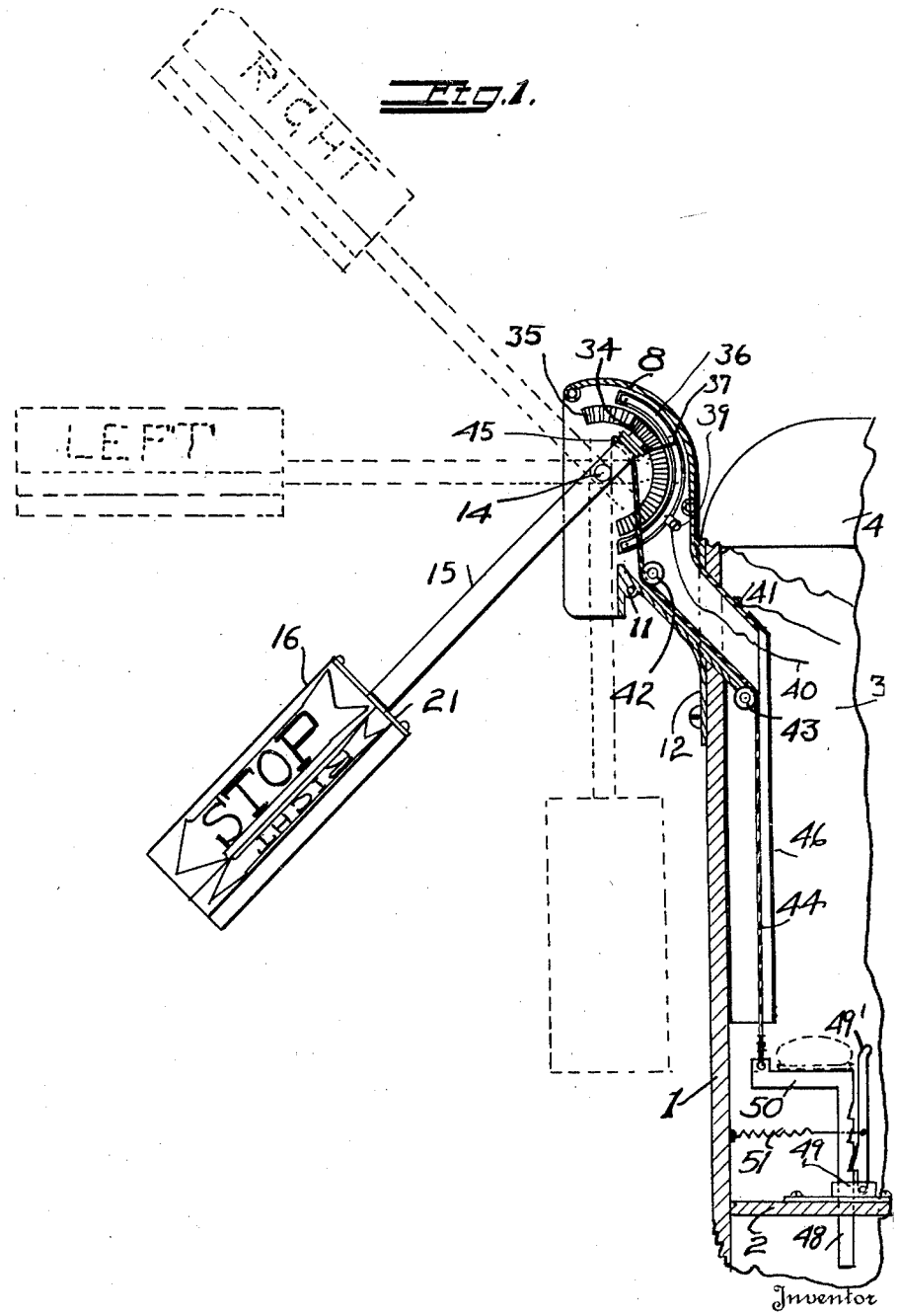

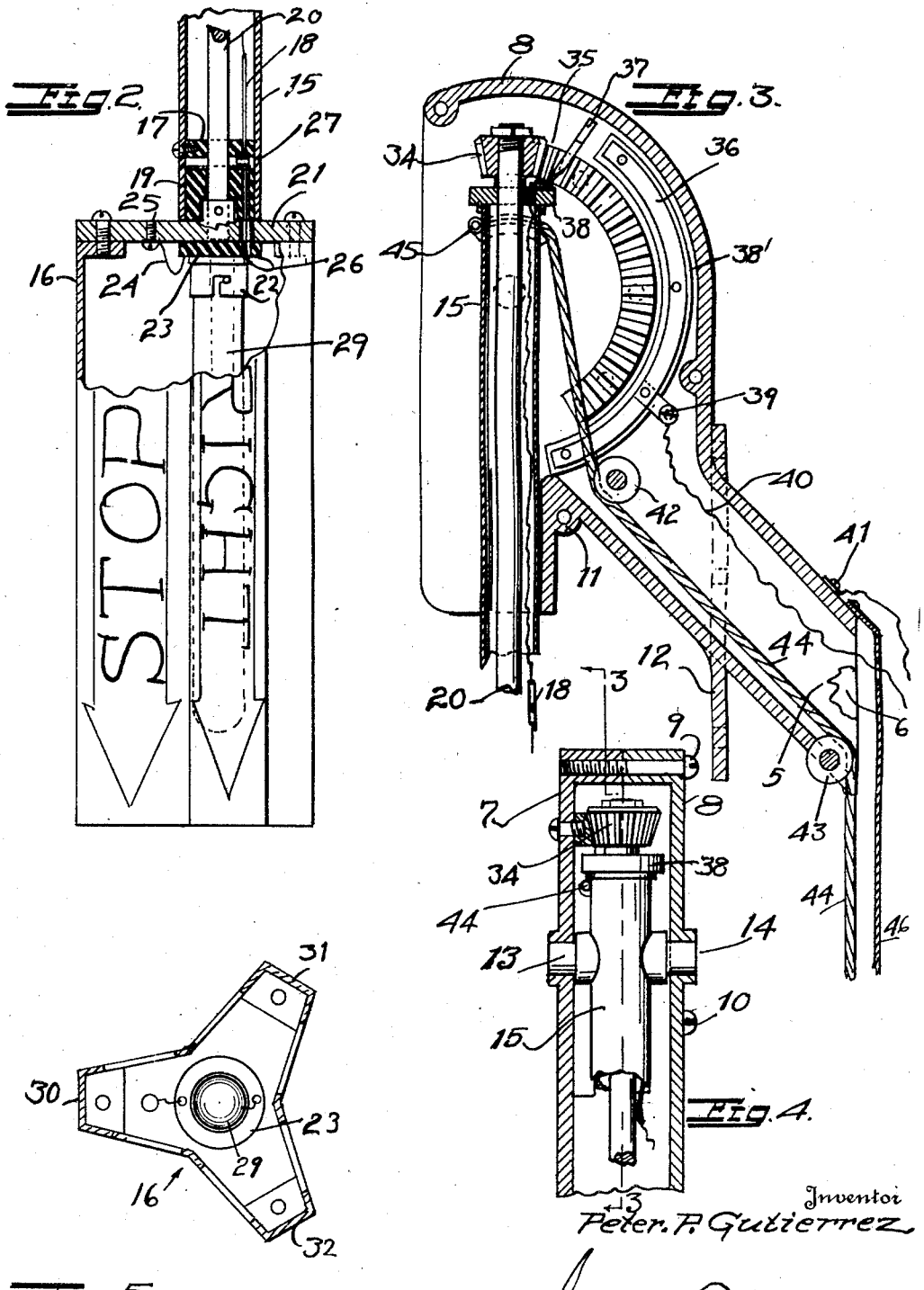

Patented Feb. 24, 1931

1,794,014

UNITED STATES PATENT OFFICE

PETER PAUL GUTIERREZ, OF WATSONVILLE, CALIFORNIA

AUTOMOBILE STOP AND TURNING SIGNAL

Application filed January 30, 1929. Serial No. 336,064.

This invention relates to an automobile stop and turning signal, and its especial object is to provide a signal which can be used on all sorts of automobiles and trucks to enable persons approaching the car or truck from either direction to have an adequate signal whenever the driver desires to make a turn, or desires to stop.

An object of the invention is to provide means whereby a single light will illuminate all of the stop and turning signals, and whereby which ever signal is to be used will be presented to the oncoming car either at front or rear of the signal so clearly as to fully advise him of the action to be taken by the driver of the car carrying this signal.

Another object of the invention is to provide means whereby all three signals—"Stop" "Left" and "Right" shall be carried from the same instrument, thereby reducing the complication of the apparatus as much as possible.

Another object is to provide means for operating the signal by foot, leaving the driver's hands free for operating the vehicle.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a vertical sectional view through a portion of the automobile and a portion of the signalling apparatus showing its construction, Figure 2 is a view of the lower portion of the signal including the lamp and means for connecting the circuit wires to the lamp, Figure 3 is a view on a slightly larger scale of the upper portion of the bracket to which the signal is pivoted, Figure 4 is a transverse view of the casing to which the signal is connected, Figure 5 is a transverse sectional view of the signal arm separate from the supporting mechanism.

The signal is arranged to be supported from a hollow bracket, which is installed on the front portion of the body of an automobile just ahead of the instrument board, or closely adjacent to the same, and the plan of operation is to move the arm to the position stop, left or right turn at the will of the operator.

In the drawing the numeral 1 indicates the side of the automobile; 2 a portion of the floor boards immediately adjacent the clutch and brake pedals, while 3 indicates the dash and 4 an inside view of the end of the instrument board, all of which construction is common to the art. A suitable hole is cut to receive the tubular members 5 and 6 which form the lower part of the bracket for supporting the signal. This tubular member extends upwardly outside the body of the machine, and has two semi-circular members 7 and 8, said members being connected together at 9 and 10, there being an additional bolt in the hole 11 when the bracket is completely assembled.

The lower portion of the bracket at each side is provided with a flange at 12 through which flange suitable bolts may be passed to secure the signal in place on the machine.

The two members 7 and 8 have openings to receive the short trunions 13 and 14 on the tubular arm 15 which carries the signal 16 at its end. The tubular member 15 has a fixed insulating bushing therein as indicated at 17 to which one electric current wire 18 is connected, and there is also a bushing 19 which is slipped over the rod 20 which supports and carries the plate 21 which carries the signal casing 16. The rod 20 is secured in a hub at the center of the plate 21 and is grounded to the other parts of the apparatus so that the socket 22 which is carried by the flat insulating member 23 can be grounded by means of the wire 24 which is secured to the screw 25. The other side of the socket is carried by means of the wire 26 to a small commutator ring on the top of the bushing 19 as indicated at 27 so as to maintain the supply of current from the wire 18.

The signal itself is illuminated by means of the lamp 29, and it consists of three equally spaced members 30, 31 and 32, each of which has a pair of arrows with the words "Stop"

"Right" and "Left" painted on a suitable transparent or translucent surface carried by the signal. These words are so painted that when the signal is turned to the position shown in Figure 1 the words will appear as indicated in that figure both from the front of the vehicle and from the rear of the vehicle.

The signal proper is rotated to produce this effect by the gear 34 on the upper end of the shaft 20, said gear engaging a flat segment gear 35 on the inside of the casing 8. In order to provide for delivering the necessary current to the lamp there is an additional commutator 36 inside the housing 8, which is engaged by the spring contact 37 as soon as the arrow turns upwardly a small amount. This spring contact 37 is carried by a washer 38 on the top of the tubular member 15 which supports the signal and which swings on the trunnions 13 and 14. The commutator strap 36 is carried by an insulated strap just under it, and there is a connecting screw 39 which enables the wire 40 to be connected thereto.

The ground wire can be connected to any suitable portion of the casing, as for example at 41 in Figure 3.

Inside the housing there are two small pulleys 42, 43 over which a cable 44 passes, said cable also being connected to the upper end of the tubular member 15 by means of a pin 45.

Inside the vehicle there is a sheet metal housing 46 which encloses the cable 44, and which housing is placed in the position shown mainly for the protection of the cable and to prevent its interference with the signal. This cable is connected at its lower end to an inverted L shaped operating member 48. This member passes through a hole in a plate 49 which is secured to the floor board 2, and which has the spring held latch 49' to hold the member 48 in any one of the three positions indicated in Figure 1. This member 48 has the horizontal portion 50 on which the foot of the operator is placed for the operation of the signal, and a spring 51 causes the latch 49 to engage the notches in the member 48. This member 48, 50 may be pushed down by the foot to bring the signal to any one of the three positions shown in Figure 1, or the latch 49' may be pushed to one side to release that rod and to permit the slide 48 to rise and allow the signal to follow to the position shown in dotted lines in the lower portion of Figure 1.

The operation of the apparatus is as follows:

When the operator wishes to indicate a turn or stop the member 48 is forced downward by the foot of the operator to bring the signal to any one of the positions shown in Figure 1. This will be determined by the notches in the sides of the member 48. The signal is restored by releasing the latch 49 by simply pushing it to one side and permitting the signal to fall.

Having thus described my invention, what I desire to secure by Letters Patent of the United States is as follows, but modifications may be made in carrying out the invention as shown in the drawings and in the above particularly described form thereof, within the purview of the annexed claims.

1. An automobile signal of the class described comprising a hollow rotatable signal member having three spaced indicating members, each of said indicating members having two transparent faces, one of said faces having indicating words to be read from the back, the other having words reversed to be read from the front, means to illuminate all of said faces from the interior of the signal member, means to turn the member to bring said faces in proper indicating order and means to raise the signal member to positions corresponding in meaning to the indicating words displayed.

2. An automobile signal of the class described, comprising a bracket, an arm mounted on said bracket, a hollow rotatable signal depending from said arm, three hollow indicating members forming part of said signal, two transparent faces on each of said indicating members, indicating words adapted to be read from the rear and the front of the signal, means to illuminate the several indicating faces, means to raise the signal to any predetermined position, and means to rotate the signal an amount corresponding to the extent that the signal is raised.

In testimony whereof I have hereunto set my hand.

PETER P. GUTIERREZ.